(12) United States Patent
Chiang et al.

(10) Patent No.: US 7,117,337 B2
(45) Date of Patent: Oct. 3, 2006

(54) APPARATUS AND METHOD FOR PROVIDING PRE-TRANSLATED SEGMENTS FOR PAGE TRANSLATIONS IN SEGMENTED OPERATING SYSTEMS

(75) Inventors: Men-Chow Chiang, Austin, TX (US); Sujatha Kashyap, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 10/782,676

(22) Filed: Feb. 19, 2004

(65) Prior Publication Data

US 2005/0188176 A1     Aug. 25, 2005

(51) Int. Cl.
G06F 12/10    (2006.01)
(52) U.S. Cl. ...................... 711/206; 711/207
(58) Field of Classification Search ............... 711/202, 711/203, 206, 207
See application file for complete search history.

(56) References Cited

U.S. PATENT DOCUMENTS

| 4,380,797 | A | 4/1983 | Desyllas et al. |
| 5,321,836 | A | 6/1994 | Crawford et al. |
| 5,706,461 | A | 1/1998 | Branstad et al. |
| 5,956,751 | A | 9/1999 | Lai ............................. 711/172 |
| 5,960,466 | A | 9/1999 | Belgard ...................... 711/213 |
| 6,226,733 | B1 | 5/2001 | Belgard ...................... 711/213 |
| 6,308,247 | B1 | 10/2001 | Ackerman et al. .......... 711/206 |

OTHER PUBLICATIONS

IBM Technical Disclosure Bulletin, "Segment Translation Lookaside Entries", vol. 27, No. 2, Jul. 1984, p. 1251.

*Primary Examiner*—Hiep T. Nguyen
(74) *Attorney, Agent, or Firm*—Duke W. Yee; Marilyn Smith Dawkins; Wayne P. Bailey (57) ABSTRACT

A mechanism for generating pre-translated segments for use in virtual to real address translation is provided in which segments that are determined to meet a density threshold are promoted to a pre-translated segment class. The pages of these segments are moved to a contiguous portion of memory and the segment table entry corresponding to the segment is updated to indicate the segment to be a pre-translated segment and to include the base real address for the contiguous portion of memory. In one embodiment, as each page is moved, its page table entry is updated to point to the new location of the page so that the page is still accessible during promotion of the segment to a pre-translated segment. In this way, virtual-to-real address translation may be performed by concatenating the segment base real address, the page identifier, and a byte offset into the page.

20 Claims, 7 Drawing Sheets

APPARATUS AND METHOD FOR PROVIDING PRE-TRANSLATED SEGMENTS FOR PAGE TRANSLATIONS IN SEGMENTED OPERATING SYSTEMS

RELATED APPLICATION

The present application is related to co-pending and commonly assigned U.S. patent application Ser. No. 10/782,497 entitled "Apparatus and Method for Lazy Segment Promotion for Pre-Translated Segments," filed on even date herewith.

BACKGROUND OF THE INVENTION

1. Technical Field

The present invention is generally directed to address translation for accessing portions of computer memory. More specifically, the present invention is directed to a mechanism for bypassing the translation lookaside buffer (TLB) hierarchy of known address translation systems by providing pre-translated segments for page translations.

2. Description of Related Art

With the advent of faster processors and large amounts of memory in modern computing devices, applications have started using larger working sets, i.e. a larger amount of data and instructions that needs to be loaded into system memory. Faster processors can support a higher level of multi-programming which in turn results in an increase in the cumulative working set size. Despite the huge increase in physical memory in modern computing devices, the size of the memory address mapping mechanisms, e.g. the translation lookaside buffer (TLB), have not increased much due to hardware costs and other constraints.

A translation lookaside buffer (TLB) is a table in the processor that contains cross-references between the virtual and real addresses of recently referenced pages of memory. The TLB functions like a "hot list," or quick-lookup index, of the pages in main memory that have been most recently accessed.

When a cache miss occurs, data must be fetched from an address in virtual memory. This virtual memory address must be translated into a real-memory address, or physical address. If the real-memory address of a desired page is not in the TLB, a further delay is incurred while the real address is determined by other means.

Because the size of the TLB has not increased with the increase in the size of physical memory, the reach of the TLB in modern computing devices is inadequate for supporting large working sets. As a result, the TLB miss ratio increases as working sets get larger. In addition, large working sets also result in a large page table footprint. This makes it increasingly less likely that the page table entry required to satisfy a TLB miss will be found in the level of cache closest to the processor. Consequently, the amount of time it takes to satisfy TLB misses also increases. TLB misses have become a critical performance bottleneck for large-memory machines.

Proposed solutions to the TLB latency problem include increasing the size of the pages of memory, e.g. superpages, and providing support for multiple page sizes. Superpages are a mechanism that has been devised for reducing the number of translation lookaside buffer (TLB) and page table entries required to map memory. Superpages are large virtual pages used to increase the memory mapped by each page table entry. Superpages increase the relative TLB coverage and reduce the number of TLB misses, which require expensive (slow) address translations.

Superpages are useful when large objects need to be mapped, but are not suitable for all applications. If the application does not require the mapping of large objects, the use of superpages could result in considerable internal fragmentation, without considerably reducing the number of translation entries. Providing additional support for multiple page sizes (including superpages) requires considerable operating system modifications and introduces additional overhead into the translation mechanism.

Thus, it would be beneficial to have an improved mechanism for performing virtual to real address translations that reduces the required size of the page table for large memory systems while minimizing the overhead for performing such translations.

SUMMARY OF THE INVENTION

The present invention provides a mechanism for generating pre-translated segments for use in virtual to real address translation. With this mechanism, segments that are determined to meet a density threshold are promoted to a pre-translated segment class. The pages associated with these segments are moved to a physically contiguous portion of memory and the segment table entry corresponding to the segment is updated to indicate the segment to be a pre-translated segment and to include the base real address for the contiguous portion of memory. In this way, in order to perform virtual-to-real address translation, all that is necessary is to concatenate the segment base real address, the page identifier, and a byte offset into the page.

When this address is being resolved, the page identifier provides an offset into the contiguous portion of memory to thereby identify the base address of the page and the byte offset into the page provides an offset into the page from the base address of the page. As a result, the memory location may be identified based only on segment base real address, the page identifier and the byte offset into the page and there is no need to use the translation lookaside buffer and page table hierarchy to resolve the virtual-to-real address translation.

In addition to the above, additional aspects of the present invention provide for a "lazy" promotion mechanism for pre-translated segments. That is, for segments that have been deemed to meet criteria for promotion to a pre-translated segment, the promotion is performed in such a manner that pages within the segment are accessible during the promotion phase. With the present invention, when a segment meets promotion criteria, a promotion request is placed in the queue of a dedicated kernel process. The dedicated kernel process awakens when there is a request in the queue and processes the request in the following manner.

First, the kernel process determines if there is a contiguous portion of memory sufficient in size to store the segment. If not, the processing of the request is deferred until a contiguous portion of memory of sufficient size is available. If there is a contiguous portion of memory of sufficient size to store the segment, pages of the segment are copied over to this contiguous portion of memory one at a time. As each page is copied over, its corresponding page table entry is updated to point to the new memory location of the page. In this way, the page is made accessible during the promotion phase.

When all of the pages have been copied over to the contiguous portion of memory, the segment table entry for the segment is updated to include the base real address of the contiguous portion of memory and a pre-translated segment flag field is set. Thereafter, references to pages in the segment may be resolved using the segment table entry without having to perform a lookup in the page table or translation lookaside buffer.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
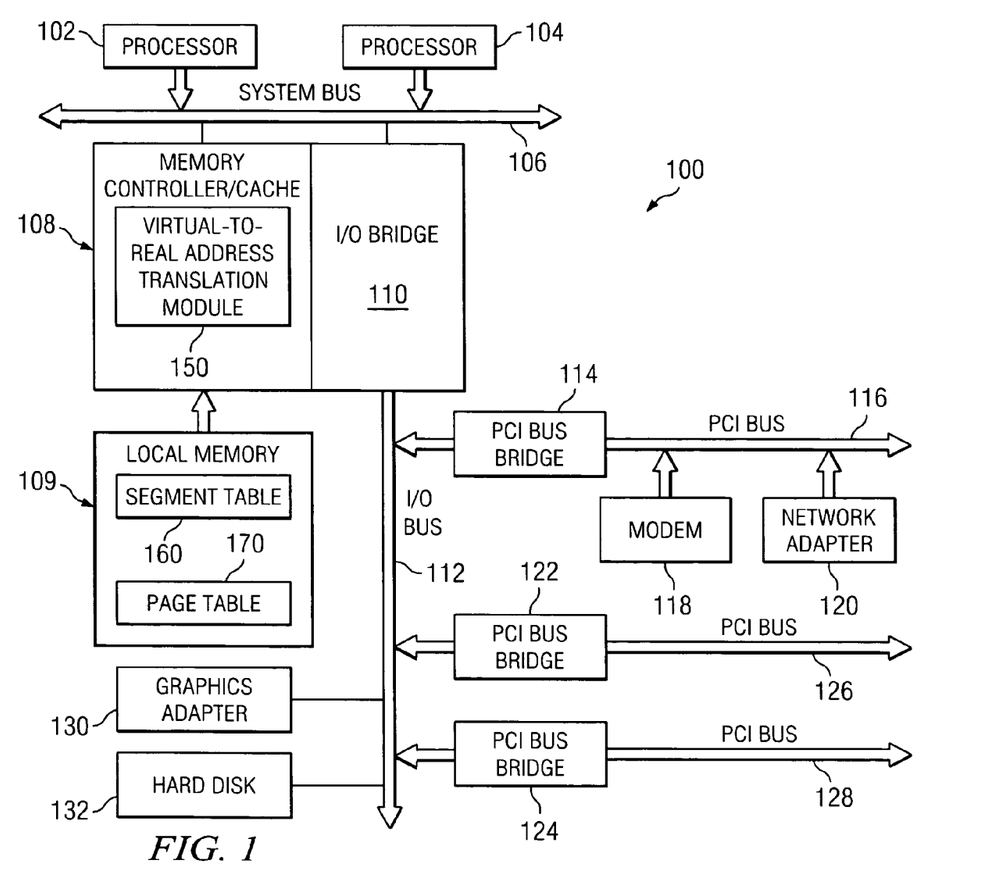
FIG. 1 is an exemplary block diagram of a computing device in which the present invention may be implemented.

The present invention provides an apparatus and method for generating pre-translated segments for bypassing the translation lookaside buffer hierarchy for page table translations. As such, the present invention is implemented in a computing device such as a stand-alone computing device, client computing device, server computing device, or the like. FIG. 1 is provided as one example of a computing device in which the present invention may be implemented. Of course many modifications to the architecture illustrated in the exemplary computing device of FIG. 1 may be made without departing from the spirit and scope of the present invention and FIG. 1 is not intended to teach or imply any limitation on the types of computing devices in which the present invention may be implemented.

Referring to FIG. 1, a block diagram of a data processing system that may be used to implement aspects of the present invention is depicted in accordance with one exemplary embodiment of the present invention. Data processing system 100 may be a symmetric multiprocessor (SMP) system including a plurality of processors 102 and 104 connected to system bus 106. Alternatively, a single processor system may be employed. Also connected to system bus 106 is memory controller/cache 108, which provides an interface to local memory 109. I/O bus bridge 110 is connected to system bus 206 and provides an interface to I/O bus 112. Memory controller/cache 108 and I/O bus bridge 110 may be integrated as depicted.

The memory controller/cache 108 preferably includes a virtual-to-real address translation module 150 whose purpose it is to translate virtual addresses provided by one or more of the processors 102, 104 into real address, or physical addresses, used to access memory locations in the local memory 109. The virtual-to-real address translation module 150 may make use of a segment table 160 and a page table 170 in local memory 109 to perform this virtual-to-real address translation as discussed hereafter.

Peripheral component interconnect (PCI) bus bridge 114 connected to I/O bus 112 provides an interface to PCI local bus 116. A number of modems may be connected to PCI local bus 116. Typical PCI bus implementations will support four PCI expansion slots or add-in connectors. Communications links to other computing devices may be provided through modem 118 and network adapter 120 connected to PCI local bus 116 through add-in connectors.

Additional PCI bus bridges 122 and 124 provide interfaces for additional PCI local buses 126 and 128, from which additional modems or network adapters may be supported. In this manner, data processing system 100 allows connections to multiple network computers. A memory-mapped graphics adapter 130 and hard disk 132 may also be connected to I/O bus 112 as depicted, either directly or indirectly.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

In a preferred embodiment of the present invention, the computing device shown in FIG. 1 makes use of a virtual memory system in which applications reference instructions and data in memory using virtual addresses that must be resolved to real memory addresses in order to access real memory locations. As such, the local memory 109 makes use of a segmented virtual address space. As previously stated, the present invention is directed to improving address translation in systems which use segmented virtual addresses spaces by providing a mechanism for generating pre-translated segments.

Figure 2:
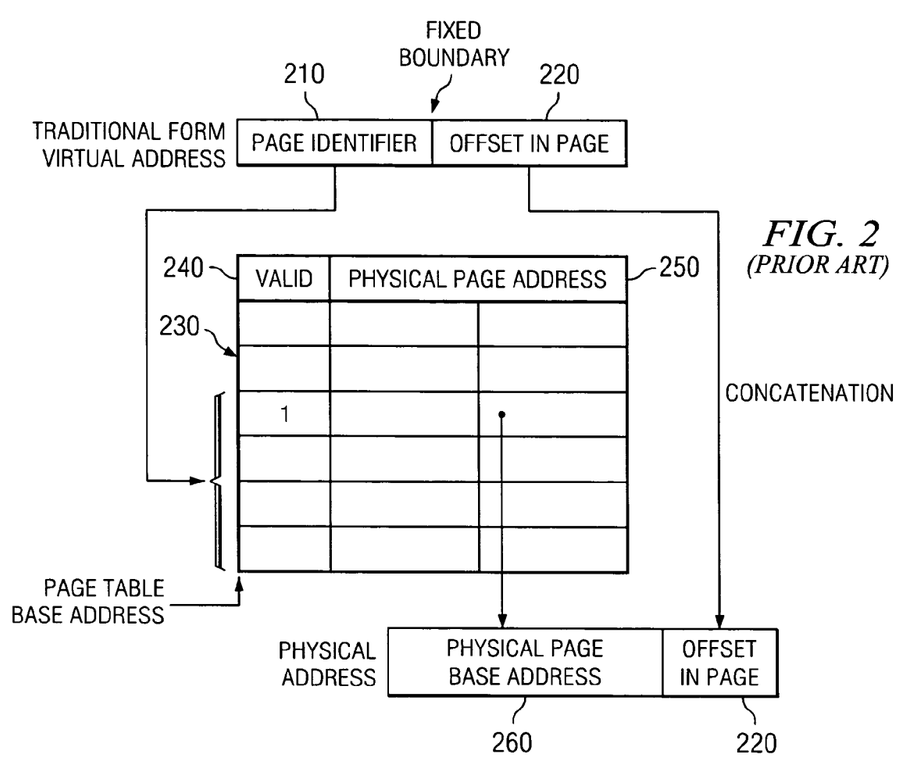
FIG. 2 is an exemplary diagram illustrating a prior art methodology for translating a virtual address into a physical address for accessing instructions/data in physical memory.

FIG. 2 is an exemplary diagram illustrating a prior art methodology for translating a virtual address into a physical address for accessing instructions/data in physical memory. As shown in FIG. 2, the virtual address 200 includes a page identifier 210 and an offset into the page 220. The virtual address page identifier 210 is indexed with a page table 230. The page table 230 includes a physical page address 240 and a valid bit 250 indicating whether the mapping is valid. If a valid bit is set, the page table supplies the corresponding physical page number, i.e. the starting address of the page in memory. If the valid bit is off, then the page is not present in memory. The physical address 240 includes the physical page base address 260 concatenated with the virtual address offset into the page 220.

Figure 3:
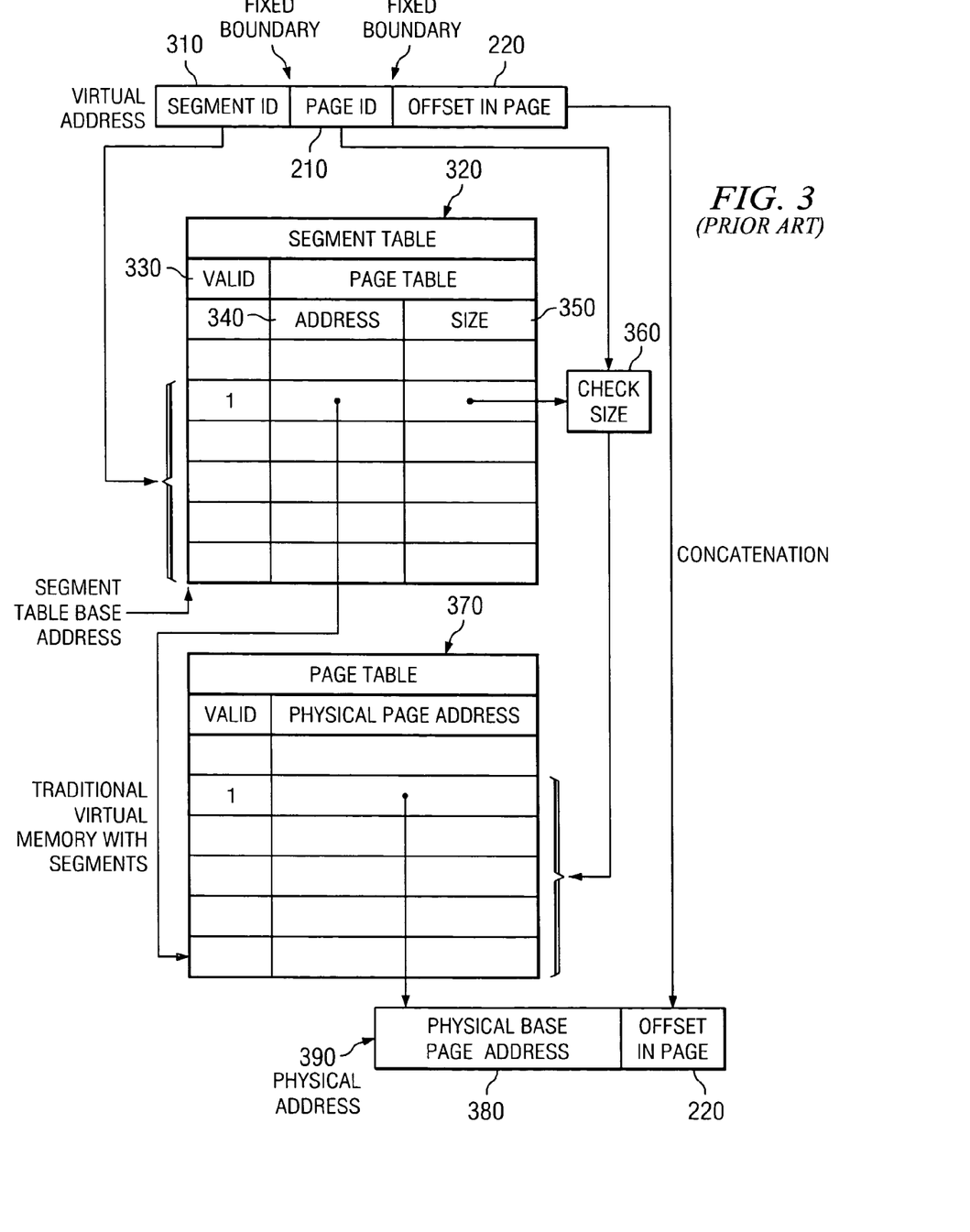
FIG. 3 illustrates a traditional form of segmented virtual address mapping for a variable-size data block.

FIG. 3 illustrates a traditional form of segmented virtual address mapping for a variable-size data block. In the segmented virtual memory, the virtual address, in addition to the page identifier 210 and offset into the page 220, also includes a segment identifier 310 that is indexed to a segment table 320 including a valid bit 330, a page table address 340, and a page table size 350. The virtual address page identification 210 and the segment table page table size 350 are supplied to a size check function 360. The size check function 360 checks the page ID 210 and page table size 350 to generate an offset into the page table identified by the page table address 340. The output from the size check function 360 and the page table address 340, which is the page table base address, is indexed to a page table 370. From the page table, the physical page base address 380, or real page number, is identified. The offset into the page 220 is then concatenated with the physical base page address 380 to produce the physical address 390.

As mentioned previously, the present invention provides a mechanism for bypassing the page table hierarchy illustrated in FIG. 3 for pre-translated segments. It has been observed from studying the page tables on various computing devices running various applications that, for the vast majority of segments (almost 99%, in conducted experiments), the entire address range of the segment is mapped in the page table. That is, every page in the segment is present in memory. Additionally, almost all these segments consist of completely contiguous pages. In the conducted experiments, segments exhibiting these properties accounted for approximately 87% of all the pages accessed.

In view of these findings, the basic premise of the present invention is to completely avoid having to access the translation lookaside buffer/page table hierarchy completely for segments that have these properties. This can be achieved by allocating all the pages belonging to such a wholly accessed segment in contiguous physical memory. The base address of the segment's region of contiguous memory may be stored as a field in the segment table entry for that segment. Thus, accesses to all pages within the segment can be translated solely through the segment table entry, without the need to access the TLB/page table hierarchy at all. This in essence, frees up 87% of the space currently used in the TLB and page table for segments which need to go through the conventional translation mechanism. This will result in much fewer TLB misses and a smaller page table footprint. Thus, upon the occurrence of a TLB miss, it will be much more likely that the required page table entry will be found in cache.

In addition, by identifying segments that may be wholly accessed and providing mechanisms for performing the translation based only on the segment table entry, the present invention reduces the time spent performing the translation itself since there is no further need to perform a TLB lookup and/or page table lookup of these segments. Thus, the segments that may be wholly accessed are effectively removed from the TLB hierarchy thereby freeing up space in the TLB hierarchy for other segments that need to use the standard TLB hierarchy translation mechanisms. This permits larger memory systems to have larger working sets loaded into memory and thereby, reduces TLB misses.

Figure 4:
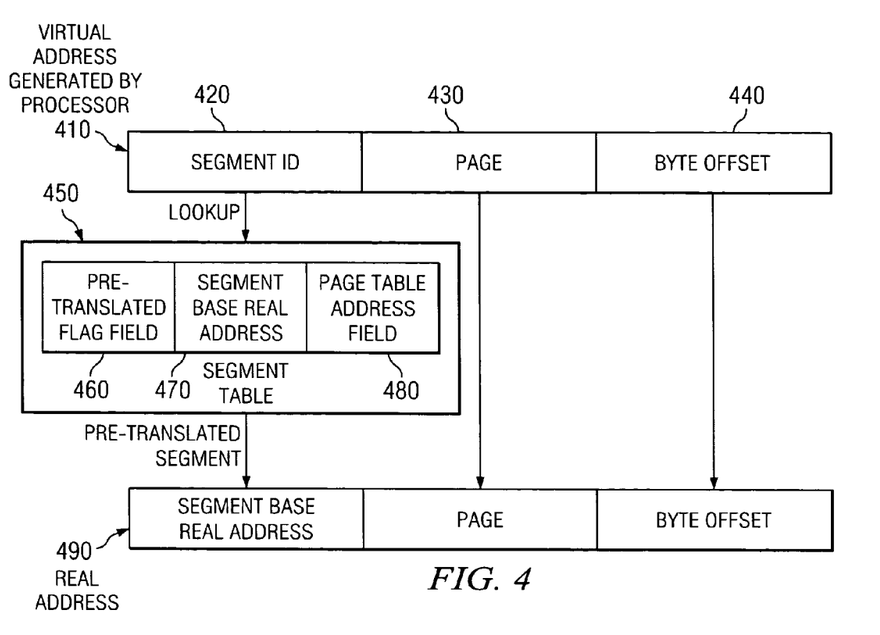
FIG. 4 illustrates an exemplary overview of the virtual to real address translation mechanism of the present invention for pre-translated segments.

FIG. 4 illustrates an exemplary overview of the virtual to real address translation mechanism of the present invention for pre-translated segments. As shown in FIG. 4, a virtual address 410 is provided by the processor for accessing a memory location. This virtual address 410 includes a segment identifier 420, a page identifier 430 and a byte offset into the page 440.

When the virtual address 410 is received by the virtual-to-real address translation mechanism of the present invention, a lookup of the segment identifier 420 in the segment table 450 is first performed to determine if the segment is a pre-translated segment. As illustrated, the segment table 450 includes segment table entries (STEs) that include a pre-translated flag field 460, a segment base real address field 470, and a page table address field 480. If variable size pages are supported, an additional size field may be provide as illustrated in FIG. 3. In addition, in an alternative embodiment, rather than have separate pre-translated flag fields 460 and segment base real address fields 470, these two fields may be combined such that when a predetermined value, such as −1, is present in the segment base real address field 470, it is determined that the segment is not a pre-translated segment and if the segment base real address field 470 includes a value other than −1, the value is the actual base real address for the segment.

The pre-translated flag field 460 stores a value that is indicative of whether the corresponding segment has been pre-translated or not. A segment is pre-translated if the segment has been wholly loaded into a contiguous portion of real memory in the manner described hereafter. The segment base real address field 470 stores the base real address for this contiguous portion of memory. The page table address field 480 is the same as in the prior art described in FIG. 3 and is used when the segment is not a pre-translated segment.

It may be determined whether a segment is a pre-translated segment by looking up the segment in the segment table 450 based on the segment identifier 420 and determining the value set in the pre-translated flag field 460. For example, if this field 460 is a single bit that is set when the segment is pre-translated, then if the bit is determined to be set when performing a lookup in the segment table, it can be determined that the segment is a pre-translated segment.

If the segment is a pre-translated segment, the segment's base real address from field 470 is retrieved. The real address 490, or physical address, for the memory location corresponding to the virtual address 410 is then determined to be a concatenation of the segment base real address 470, the page identifier 430 and the byte offset into the page 440.

In resolving this address, the translation hardware of the computing device is provided with an additional adder for adding the segment base real address 470 and the page identifier 430, which is an offset into the segment identified by the base real address 470. The conventional translation hardware will then add the byte offset into the page 440 in order to generate the entire real address that comprises the addition of the segment base real address 470, the page identifier 430 and the byte offset into the page 440. In essence, using this address translation scheme, the translation hardware identifies the memory location by determining the offset into the segment that identifies the page of real memory, and then the offset into the page that identifies the actual real memory location.

As discussed above, the present invention operates on segments that may be wholly accessed. Thus, the present invention includes a mechanism for identifying these segments that may be wholly accessed, as opposed to other segments that may not be wholly accessed. The identification of theses segments is based on the density of the segments where "density" is defined as the percentage of all pages from that segment that are present in memory and thus, have valid page table entries, i.e. the valid bit for the page table entry is set for those pages. From this definition, it is clear that those segments that have a density of 1, i.e. all of the pages in the segment are in memory and have valid page table entries, may be wholly accessed using the segment table identifier.

While a density of 1 will ensure that there is no memory wastage in pre-translating the segment, i.e. all pages in the segment will be or have been accessed and pre-translating will not load pages that will not be or have not been accessed, it is not necessary to insist on a density of 1 in order to obtain the benefits of the present invention. That is, by allowing segments with densities less than 1 to be allocated as pre-translated segments, the amount of savings in terms of address translation costs, e.g., CPU time, may be increased.

Using densities less than 1 results in some "memory wastage," since some of the pages in the segments have not actually been accessed and may not be accessed. However, by specifying a tunable threshold density and only allocating segments that exceed this tunable threshold density as pre-translated segments, the amount of memory wastage may be limited while still achieving savings in terms of translation costs. Furthermore, the "holes" in the pre-translated segments, i.e. the pages of the pre-translated segments that have not actually been accessed yet, do not necessarily represent "wasted memory" since they may actually contain pages that could be accessed in the future (thus potentially saving page faults). Thus, the problem of wasted memory is actually a much smaller problem with the present invention than in other prior art mechanisms, such as superpages, where internal fragmentation causes memory wastage and where there is no mechanism for limiting such memory wastage.

In order to identify segments that may be allocated as pre-translated segments, the present invention uses a "promotion" mechanism in which segments are "promoted" to a pre-translated segment class when their densities are determined to exceed a tunable threshold density. The tunable threshold density may be set based any number of criteria including, but not limited to, a segment type, a per-process basis (similar to segment protection domains), a system wide basis, or the like, depending on the particular implementation. The tunable threshold density is preferably set and stored by the virtual-to-real address translation module 150 based on the criteria established for the particular implementation.

In order to determine whether the tunable threshold density value is exceeded by a particular segment, the density of the segment is monitored. This can be done by calculating the ratio of the number of segment pages accessed to the total number of pages defined in the segment's access range (this information is obtainable from the corresponding segment table entry for that segment). This ratio calculation is kept current by recalculating or adjusting the density each time a page fault occurs or a page table entry is mapped.

For example, upon the occurrence of a page fault or a page table entry being mapped, the number of valid page table entries, i.e. page table entries having their valid bits set, for the corresponding segment is incremented by 1 (the number of new valid page table entries created). This number is then divided by the total number of pages for the segment's access range. The resulting ratio is then compared to the tunable density threshold to determine if the tunable threshold density is met or exceeded.

Figure 5:
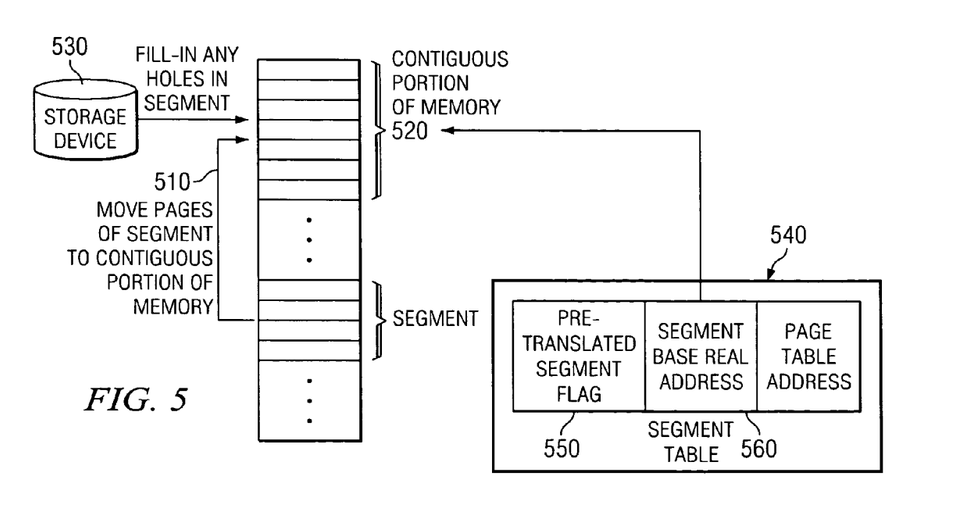
FIG. 5 illustrates an example of a process for promoting a segment to a pre-translated segment in accordance with one exemplary embodiment of the present invention.

When a segment reaches the specified tunable threshold density, or exceeds the specified tunable threshold density, the segment is promoted to a pre-translated segment. FIG. 5 illustrates an example of this promotion process.

As shown in FIG. 5, after determining that the tunable threshold density is met or exceeded, all the pages 510 within the address range of the segment are moved to a physically contiguous portion of memory 520. If the tunable threshold density is less than 1, then the "holes" in the segment are filled in. That is, the pages of the segment that were not present in memory when the tunable threshold density was reached are now brought into memory from the storage device 530. Thus, the entire segment is now allocated in a physically contiguous portion of memory 520.

The segment table entry 540 corresponding to the segment is then updated to set the pre-translated flag field 550 to indicate the segment to be pre-translated. In addition, the segment table entry 540 is updated to include the segment base real address, which corresponds to the start of the contiguous portion of physical memory where the segment is stored, in the segment base real address field 560. In an alternative embodiment in which the fields 550 and 560 are incorporated together, the process of updating the segment table entry 540 may involve merely replacing a value indicating a non-pre-translated segment in the segment base real address field 560 with an address value.

In this way, pages in the pre-translated segment may now be accessed without having to go through the TLB and page table hierarchy in order to translate the virtual address to a real address. All that is necessary is for the virtual-to-real address translation module to lookup the segment base real address in the segment table, concatenate the page identifier and byte offset into the page onto the segment base real address, and a real address for the memory location is identified. With the additional adder in the translation hardware, as discussed previously, the page identifier provides an offset into the segment identified by the segment base real address and the byte offset into the page identifies the memory location within the page identified by the offset into the segment.

As a result of the use of the present invention, the entries in the TLB corresponding to pages within segments that have been designated as pre-translated segments will no longer be accessed for address translation. The space previously taken up by these entries can thus be reused for pages that do not belong to pre-translated segments, thereby greatly reducing the number of TLB misses. Since the pages belonging to pre-translated segments need no longer maintain active entries in the page table, the footprint of the page table is also highly reduced, and the entire page table is now more likely to fit in the TLB and caches. As a result, TLB and cache misses are reduced.

Since the studies conducted indicate that an overwhelming majority of segments can be categorized as pre-translated segments, and still more segments may be included in this classification by using a tunable density threshold that is less than 1, the result is better TLB coverage, a higher probability of the relevant page table entry being in cache, and a significant reduction in address translation overhead due to improved TLB hit rations and lower TLB miss handling times. In addition, if a TLB miss occurs, there is an increased likelihood of finding the page translation entry group higher in the cache hierarchy, due to the reduce page table footprint.

The tunable density threshold allows for a tradeoff between wastage of memory and the above benefits obtained through the use of the mechanisms of the present invention. In computer systems where memory is abundantly available, the threshold density can be set to a lower value (less than 1.0), to allow more segments to be classified as pre-translated segments. When memory is not abundantly available, the threshold density may be set to 1.0, thereby eliminating any wastage of memory while still deriving benefits from the improved translation mechanism. Furthermore, the density threshold can be varied at run-time, thereby allowing control based on the current memory demands of the system.

Figure 6:
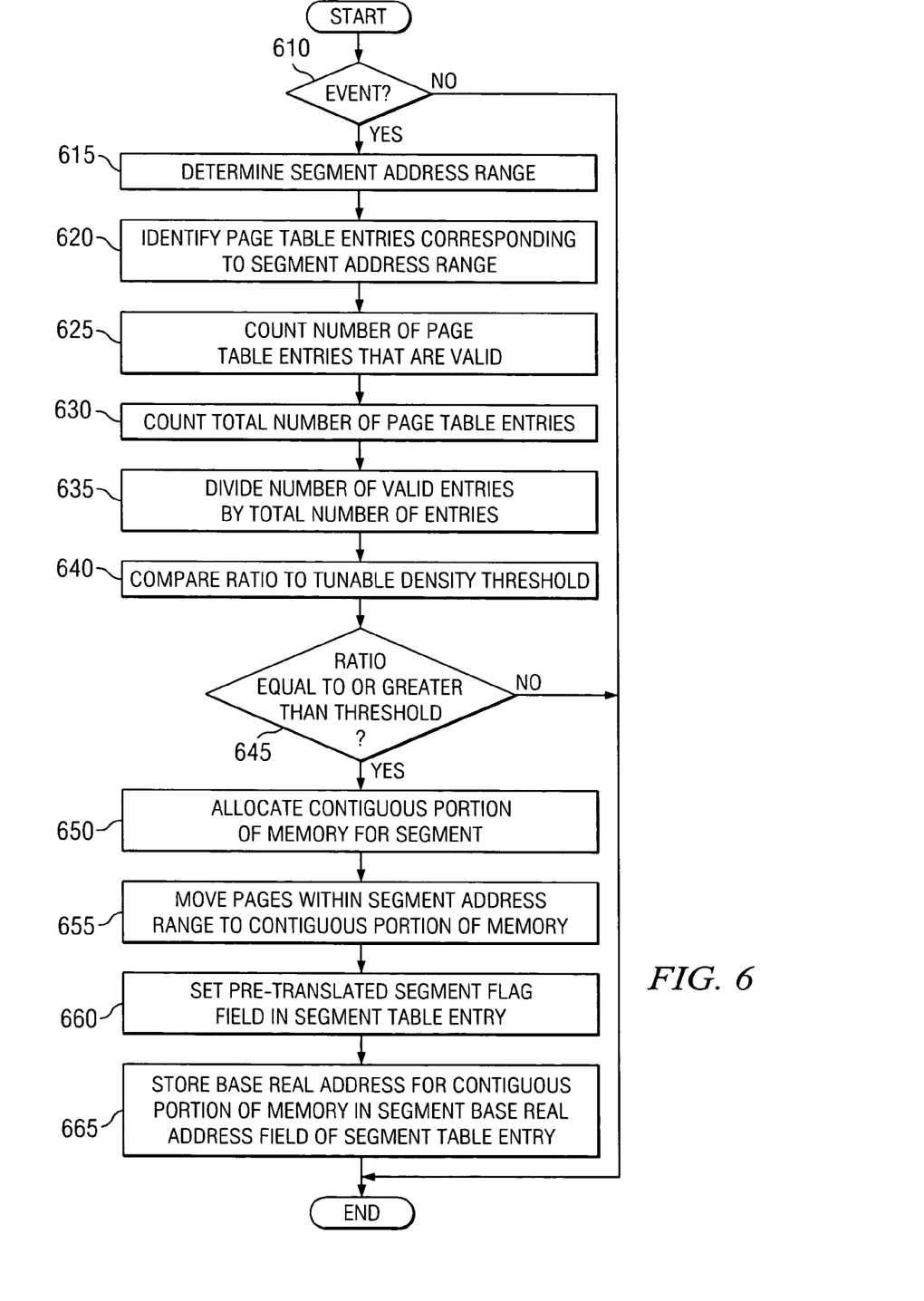
FIG. 6 is a flowchart outlining an exemplary operation for promoting a segment to a pre-translated segment in accordance with one exemplary embodiment of the present invention.
Figure 7:
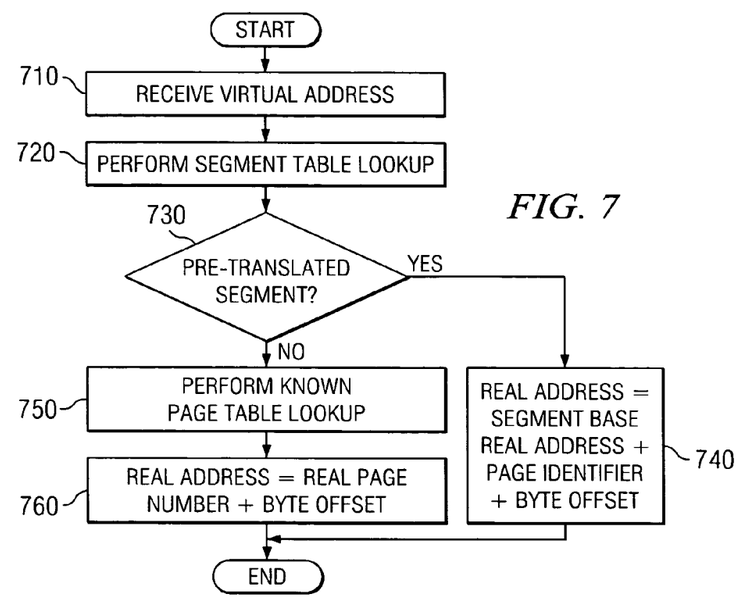
FIG. 7 is a flowchart outlining an exemplary operation of the present invention when performing virtual-to-real address translation.
Figure 9:
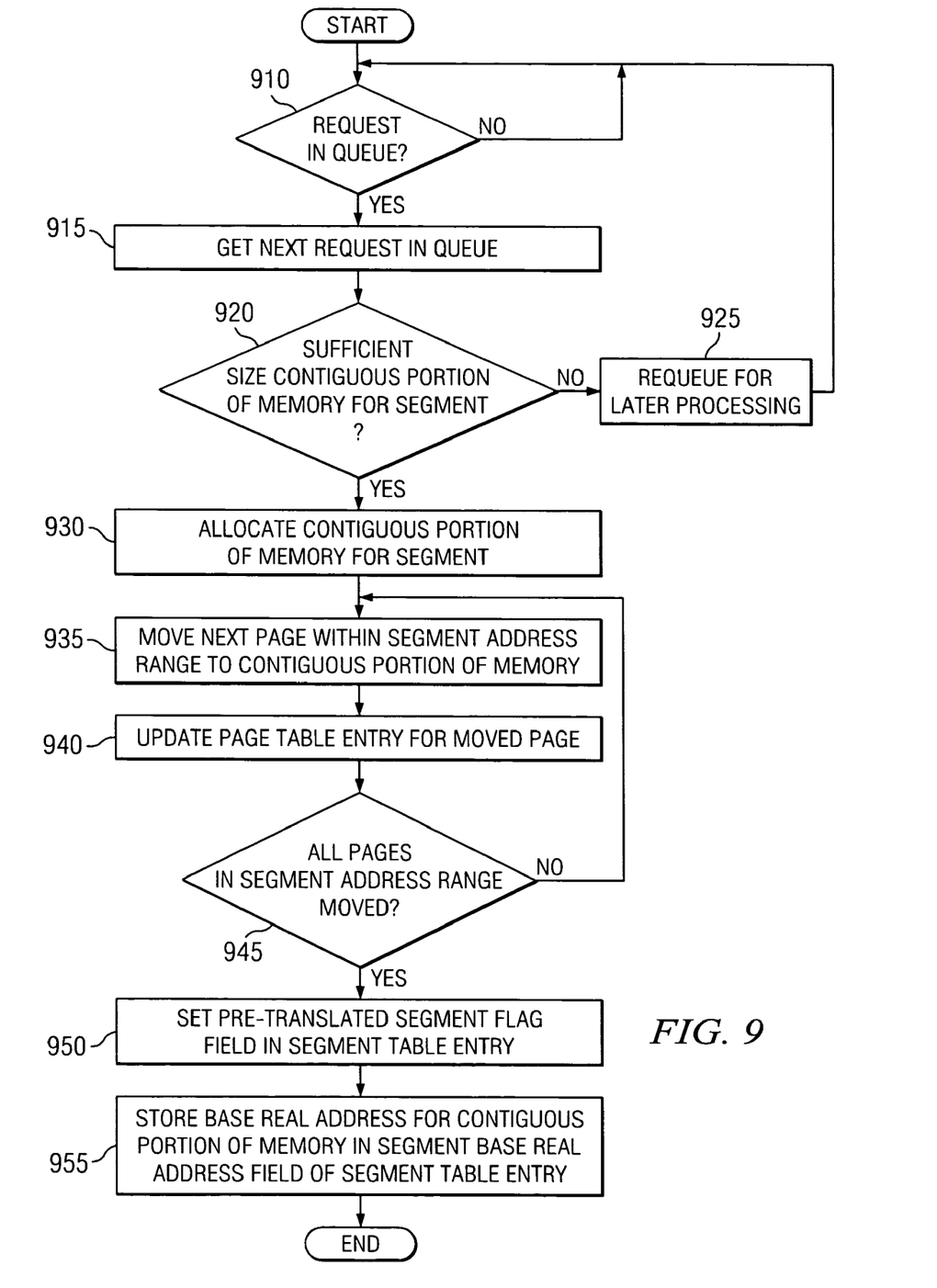
FIG. 9 is a flowchart outlining an exemplary operation of the present invention when performing lazy segment promotion for pre-translated segments.

FIGS. 6, 7 and 9 are flowcharts outlining exemplary operations of aspects of the present invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 6 is a flowchart outlining an exemplary operation for promoting a segment to a pre-translated segment in accordance with one exemplary embodiment of the present invention. As shown in FIG. 6, the operation starts by determining if an event occurs requiring checking of a segment to determine if the segment is to be promoted to a pre-translated segment class (step 610). As previously discussed above, this event may be a page fault, a page table entry being mapped, or the like. If such an event has not occurred, the operation simply terminates. If such an event has occurred, the segment address range is determined (step 615).

The page table entries corresponding to the segment address range in the page table are identified (step 620) and a count of the number of page table entries that are valid is accumulated (step 625). In addition, a count of the total number of page table entries is also accumulated (step 630). The number of valid entries is then divided by the total number of page table entries within the segment range (step 635) and the resulting ratio is compared with a tunable density threshold (step 640).

A determination is made as to whether the ratio equals or is greater than the tunable density threshold (step 645). If not, the operation ends. If the ratio is equal or greater than the tunable density threshold, a contiguous portion of memory is allocated for the segment (step 650). The pages within the segment address range are then moved to the physically contiguous portion of memory (step 655). As previously mentioned above, this may involve filling holes in the segment by retrieving pages from storage devices if the pages are not resident in memory (if the tunable density threshold is less than 1).

The pre-translated segment flag field in the segment table entry corresponding to the segment is then updated to reflect that the segment is a pre-translated segment (step 660). The segment base real address field in the segment table entry is then updated to include the base real address for the physically contiguous portion of memory (step 665). As mentioned previously, in an alternative embodiment, only the segment base real address field need be updated to indicate the segment base real address since non-pre-translated segments will have a value of −1 in this field. The operation then terminates.

FIG. 7 is a flowchart outlining an exemplary operation of the present invention when performing virtual-to-real address translation. As shown in FIG. 7, the operation starts by receiving a virtual address for translation (step 710). The segment identifier is then used to perform a segment table lookup (step 720). The value in the pre-translated segment flag field, or optionally, the segment base real address field, is then evaluated to determine if it indicates that the segment is a pre-translated segment (step 730). If the segment is a pre-translated segment, the real address is determined to be the concatenation of the segment base real address in the segment table entry, the page identifier, and the byte offset into the page (step 740). If the segment is determined to not be a pre-translated segment, then a page table lookup is performed in a known manner (step 750) and the real address is determined to be the concatenation of the real page number and the byte offset into the page (step 760). The operation then terminates.

Thus, the present invention provides a mechanism for avoiding the bottleneck associated with virtual-to-real address translation using a translation lookaside buffer (TLB) and page table hierarchy. The present invention reduces the footprint of the TLB and the page table as well as increases the speed at which translations are performed for the majority of segments. This greatly increases the efficiency of a computing device in terms of TLB and page table usage as well as access times since the speed of translation is increased and the number of TLB and cache misses is reduced.

As described previously, aspects of the present invention provide a mechanism for promoting segments of memory to a pre-translated segment state in which the segment table alone is all that is necessary to perform virtual-to-real address translation. The mechanism described above includes a tunable parameter for identifying which segments meet threshold criteria for promotion to the pre-translated segment state. When a segment is promoted to the pre-translated segment state, all of the segment's memory pages are copied over to a contiguous portion of physical memory and a single translation entry is made in the segment table entry for the segment. The translation entry contains the base real address for the segment.

While this mechanism provides an improvement over known virtual address translation mechanisms, there is a possibility that the present invention may suffer from long page fault handling latency similar to the problems associate with known mechanisms that utilize superpages. With superpages, these long page fault handling latencies occur when the page is first referenced and thus, needs to be loaded into memory. The process needs to wait for the entire superpage to get loaded before it can access data in the page.

For pre-translated segments, this long page fault handling latency occurs when a segment is selected for promotion to a pre-translated segment. At this time, the segment now needs to be copied over to a contiguous portion of physical memory. The copy overhead is proportional to the size of the segment. During this promotion phase, any reference to pages within the segment will have to wait until the segment copying is completed and the new translation has been set up. Thus, a process could potentially suffer a long access latency during the segment promotion phase.

In the case of superpages, there really is no cure for the long latency suffered since the basic transfer size in the superpages case really is the same as the superpage size. However, for pre-translated segments, a mechanism may be provided that will, in fact, reduce the access latency suffered by a process during the segment promotion phase.

With the present invention, the long latency that may be experienced by a process when it references a page within a segment that is currently undergoing the segment promotion phase is alleviated by providing a "lazy" promotion policy in which pages of the promoted segment are copied by a background process to their new location. As each page is copied to its new location, the page table entry corresponding to the page is remapped to the new location in memory for the page.

When all of the pages within the segment have been copied over, the segment's translation entry in the segment table is written and the segment is marked as a pre-translated segment. Meanwhile, during the promotion phase itself, the pages of the segment may continue to be referenced by processes since they have a valid page table entry. Thus, a process does not need to wait for the entire segment to be copied over before it can access pages within the promoted segment thereby avoiding long page fault handling latencies.

Figure 8:
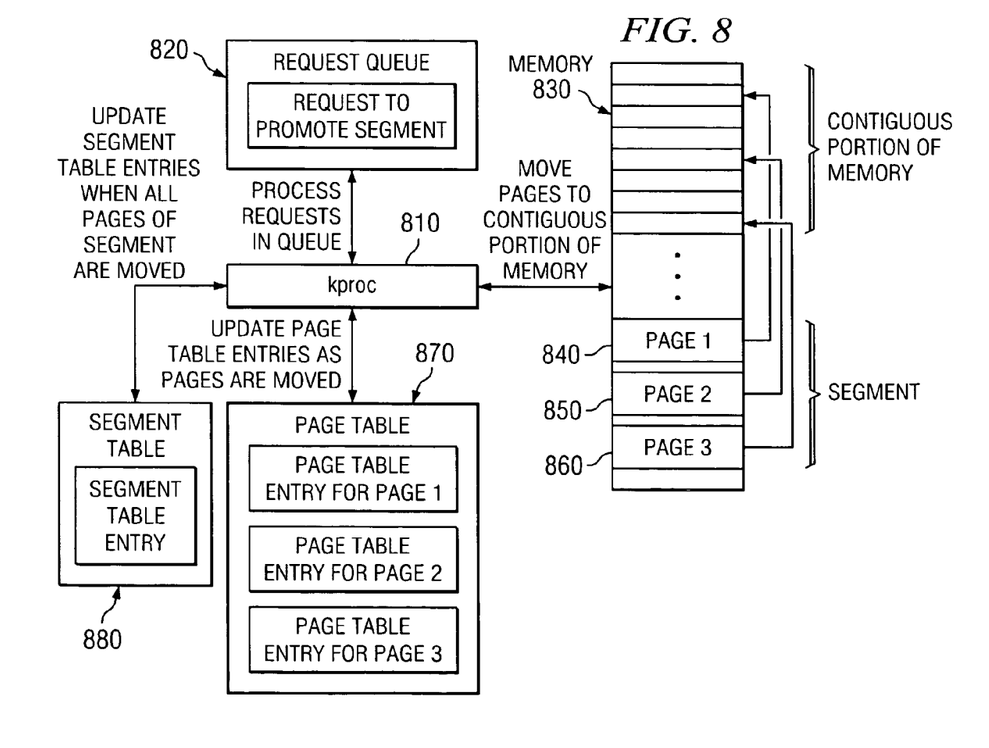
FIG. 8 is an exemplary diagram illustrating an example of a lazy segment promotion mechanism for pre-translated segments in accordance with one exemplary embodiment of the present invention.

FIG. 8 is an exemplary diagram illustrating an example of a lazy segment promotion mechanism for pre-translated segments in accordance with one exemplary embodiment of the present invention. In this exemplary embodiment, a dedicated kernel process (kproc) 810 is provided which is responsible for servicing segment promotion requests. When a segment is chosen for promotion, such as describe previously, a request is queued with the kproc 810 thereby requesting that the corresponding segment be promoted. The request queue 820 may be, for example, a FIFO (first-in, first-out) based queue, a priority queue where segments of the largest size are given higher priority, or the like. The kproc 810 is in a sleep stated while there are no requests present in the queue 820, and is awaken when a request is added to the queue 820.

When the kproc 810 services a request in the queue 820, the kproc first allocates a contiguous portion of physical memory 830 for storage of the segment referenced in the request. If a portion of contiguous physical memory of the appropriate size to store the segment cannot be found, the promotion request is deferred, e.g., by pushing it back in the request queue 820, until an appropriately sized portion of contiguous physical memory is available.

Once the contiguous portion of physical memory 830 is available, it is allocated for the segment and each page 840–860 of the segment is then copied over to this region of memory 830. Pages that are not yet present in memory, e.g., if the tunable threshold segment density is set to less than 1.0, are paged into the allocated portion of physical memory 830. As each page is copied over, its corresponding page table entry (PTE) in the page table 870 is remapped to its new location in physical memory 830. When all of the pages 840–860 are copied over into the allocated portion of physical memory 830, the segment table entry in segment table 880 corresponding to this segment is then updated to include the base real address for the allocated portion of physical memory 830 and to set the segment to a pre-translated segment state.

During the operation of the dedicated kproc 810, i.e. during the promotion phase, references to pages 840–860 within the segment may continue to be satisfied since these pages have valid page table entries in the page table 870. If the page has already been copied over, its page table entry points to its new location in the allocated portion of physical memory 830. If the page has not been copied over, its page table entry points to its original location in memory. If a reference is made to the page that is currently being copied over, this reference will have to wait till the page copy is complete before it can be satisfied. Schemes such as priority boosting could be used to ensure that the reference is satisfied as soon as possible. In this way, the latency for any page reference will be no greater than the page fault latency for the base page size.

FIG. 9 is a flowchart outlining an exemplary operation of the present invention when performing lazy segment promotion for pre-translated segments. As shown in FIG. 9, the operation starts by determining if there is a segment promotion request in the queue (step 910). If there is no segment promotion request in the queue, the operation returns to step 910 and waits until there is a segment promotion request in the queue. If there is a segment promotion request in the queue, the next request in the queue is obtained (step 915).

A determination is then made as to whether there is a contiguous portion of memory present having sufficient size for storing the segment (step 920). If not, the request to promote the segment is requeued for later processing (step 925). If there is a contiguous portion of memory of sufficient size available, it is allocated for storage of the segment (step 930).

The next page within the segment address range is then moved to the allocated contiguous portion of memory (step 935). Once the page has been moved, the page table entry for the page is updated to point to the new location of the page in the allocated contiguous portion of memory (step 940). A determination is then made as to whether all pages in the segment address range have been moved (step 945). If not, the operation returns to step 935 and the next page is moved to the contiguous portion of memory. If all pages of the segment have been moved, the pre-translated segment flag field for the segment is set in the segment table (step 950) and the base real address for the contiguous portion of memory is set as the segment base real address value in the segment base real address field of the segment table entry for the segment (step 955). The operation then ends.

Thus, the present invention provides a "lazy" promotion mechanism for segments meeting criteria for promotion to a pre-translated segment. The "lazy" promotion mechanism for pre-translated segments provides several advantages over the use of superpages, as in prior art mechanisms, the most important of which is the reduction in page fault handling latency. When an application first references a superpage and causes a page fault, the entire superpage needs to be loaded into memory before the reference can be satisfied. This results in large page fault handling times since superpages tend to be very large in size. As mentioned above, when lazy page promotion is used for pre-translated segments, references to pages within the segment can be satisfied even during the promotion phase since the pages are copied over one at a time and each copied page also has an entry in the page table for its new physical address. If a reference is made to the page that is currently being copied over, then the process that made the reference will have to wait for that page to be copied over before the reference is satisfied. This latency, however, is merely proportional to the base page size (e.g., 4K for AIX/PowerPC), which is much smaller than the latency for superpages.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of performing virtual-to-real address translations in a data processing device, comprising:
   receiving a virtual address for accessing a location of memory, wherein the virtual address includes a segment identifier;
   performing a segment table lookup based on the segment identifier to identify a segment table entry;
   determining if the segment is a pre-translated segment based on the segment table entry; and
   generating a real address for accessing a memory location corresponding to the virtual address based on a segment base real address identified in the segment table entry, if the segment is a pre-translated segment.

2. The method of claim 1, wherein if the segment is not a pre-translated segment, the method further comprises:
   performing a lookup of the virtual address in at least one of a translation lookaside buffer and a page table to thereby generate a real address for accessing a memory location corresponding to the virtual address.

3. The method of claim 1, wherein determining if the segment is a pre-translated segment based on the segment table entry includes determining if pre-translated segment flag field in the segment table entry has a particular value indicative of the segment being a pre-translated segment.

4. The method of claim 1, wherein determining if the segment is a pre-translated segment based on the segment table entry includes determining if a segment base real address field has a base real address stored therein.

5. The method of claim 1, wherein generating a real address for accessing a memory location corresponding to the virtual address based on the segment base real address includes:
   concatenating a segment base real address identified in the segment table entry for the segment with a page identifier of a page within the segment and a byte offset into the page.

6. The method or claim 5, wherein the segment base real address and the page identifier are concatenated by a first adder in translation hardware, and wherein a result of the concatenation of the segment base real address and the page identifier is concatenated with the byte offset into the page by a second adder in the translation hardware.

7. The method of claim 1, wherein the segment is a pre-translated segment if the segment may be wholly accessed.

8. The method of claim 1, wherein the segment is a pre-translated segment if the segment has a density greater than a tunable threshold density.

9. A computer program product tangibly embodied in a tangible computer readable medium for performing virtual-to-real address translations in a data processing device, comprising:
   first instructions for receiving a virtual address for accessing a location of memory, wherein the virtual address includes a segment identifier;
   second instructions for performing a segment table lookup based on the segment identifier to identify a segment table entry;
   third instructions for determining if the segment is a pre-translated segment based on the segment table entry; and
   fourth instructions for generating a real address for accessing a memory location corresponding to the virtual address based on a segment base real address identified in the segment table entry, if the segment is a pre-translated segment.

10. The computer program product of claim 9, wherein the third instructions for determining if the segment is a pre-translated segment based on the segment table entry include instructions for determining if a pre-translated segment flag field in the segment table entry has a particular value indicative of the segment being a pre-translated segment.

11. The computer program product of claim 9, wherein the third instructions for determining if the segment is a pre-translated segment based on the segment table entry include instructions for determining if a segment base real address field has a base real address stored therein.

12. The computer program product of claim 9, wherein the fourth instructions for generating a real address for accessing a memory location corresponding to the virtual address based on the segment base real address include: instructions for concatenating a segment base real address identified in the segment table entry for the segment with a page identifier of a page within the segment and a byte offset into the page.

13. The computer program product of claim 9, wherein the segment is a pre-translated segment if the segment may be wholly accessed.

14. The computer program product of claim 9, wherein the segment is a pre-translated segment if the segment has a density greater than a tunable threshold density.

15. An apparatus for performing virtual-to-real address translations in a data processing device, comprising:

means for receiving a virtual address for accessing a location of memory, wherein the virtual address includes a segment identifier;

means for performing a segment table lookup based on the segment identifier to identify a segment table entry;

means for determining if the segment is a pre-translated segment based on the segment table entry; and means for generating a real address for accessing a memory location corresponding to the virtual address based on a segment base real address identified in the segment table entry, if the segment is a pre-translated segment.

16. The apparatus of claim 15, wherein the means for determining if the segment is a pre-translated segment based on the segment table entry includes means for determining if a pre-translated segment flag field in the segment table entry has a particular value indicative of the segment being a pre-translated segment.

17. The apparatus of claim 15, wherein the means for determining if the segment is a pre-translated segment based on the segment table entry includes means for determining if a segment base real address field has a base real address stored therein.

18. The apparatus of claim 15, wherein the means for generating a real address for accessing a memory location corresponding to the virtual address based on the segment base real address includes:

means for concatenating a segment base real address identified in the segment table entry for the segment with a page identifier of a page within the segment and a byte offset into the page.

19. The apparatus of claim 18, wherein the means for concatenating includes a first adder and a second adder in translation hardware, and wherein the segment base real address and the page identifier are concatenated by the first adder in the translation hardware, and wherein a result of the concatenation of the segment base real address and the page identifier is concatenated with the byte offset into the page by the second adder in the translation hardware.

20. The apparatus of claim 15, wherein the segment is a pre-translated segment if the segment has a density greater than a tunable threshold density.

* * * * *